United States Patent [19]

Toraichi et al.

[11] Patent Number: 4,538,227
[45] Date of Patent: Aug. 27, 1985

[54] MEDICAL IMAGE PROCESSOR

[75] Inventors: Kazuo Toraichi, Sayama; Nobuyuki Otsu, Yatabemachi; Motomu Suzuki, Ohtawara, all of Japan

[73] Assignees: Agency of Industrial Science and Technology; Ministry of International Trade and Industry, both of Tokyo, Japan

[21] Appl. No.: 431,384

[22] Filed: Sep. 30, 1982

[30] Foreign Application Priority Data

Oct. 5, 1981 [JP] Japan .................................. 56-157410

[51] Int. Cl.³ .............................................. G06F 15/42
[52] U.S. Cl. .................................... 364/414; 358/111; 398/62
[58] Field of Search ................................ 364/414–415; 358/111, 96, 413; 378/62; 382/53, 56

[56] References Cited

U.S. PATENT DOCUMENTS 4,101,961   7/1978   Rieber .................................. 358/111

OTHER PUBLICATIONS

K. J. Cassell et al., "Automatic Outlining Technique for EMI Scanner Pictures" Med. & Biol. Eng. & Comput., vol. 17, No. 5, Sep. 1979, pp. 693–694.

Primary Examiner—Jerry Smith
Assistant Examiner—Gary V. Harkcom
Attorney, Agent, or Firm—Oblon, Fisher, Spivak, McClelland & Maier

[57] ABSTRACT

An image processor which can accurately and promptly obtain information about a ventricle of a living body, such as the boundary diagram, the volume, the centroid movement view and a three-dimensional view. An X-ray projection of a part to be diagnosed is quantized. The boundary and centroid of the part are obtained from the optimal ternary data using the variance of the gray-level of the image and the separation degree of a histogram. The volume and three-dimensional view of the part are obtained from this data using the gray-level method.

12 Claims, 26 Drawing Figures

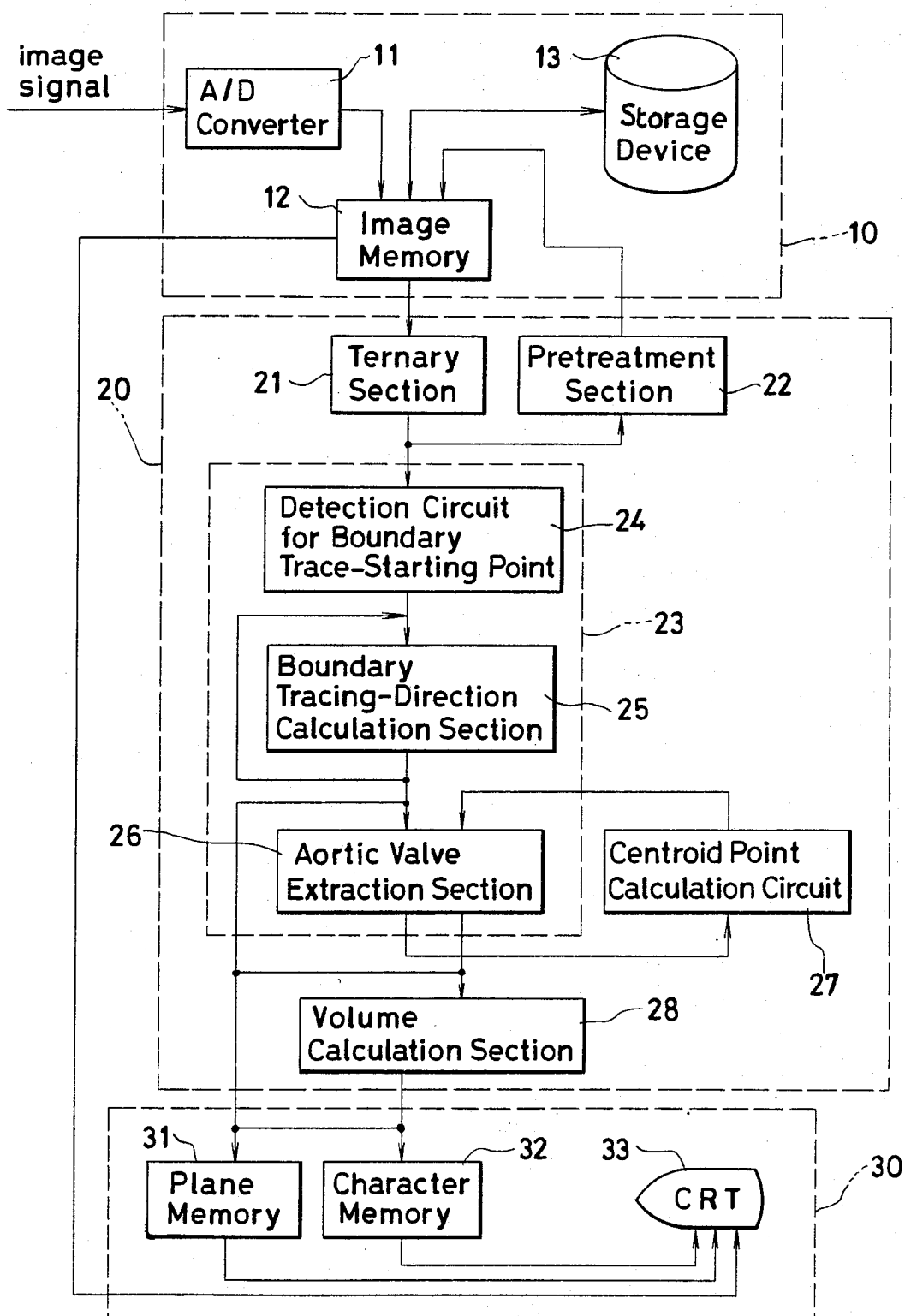

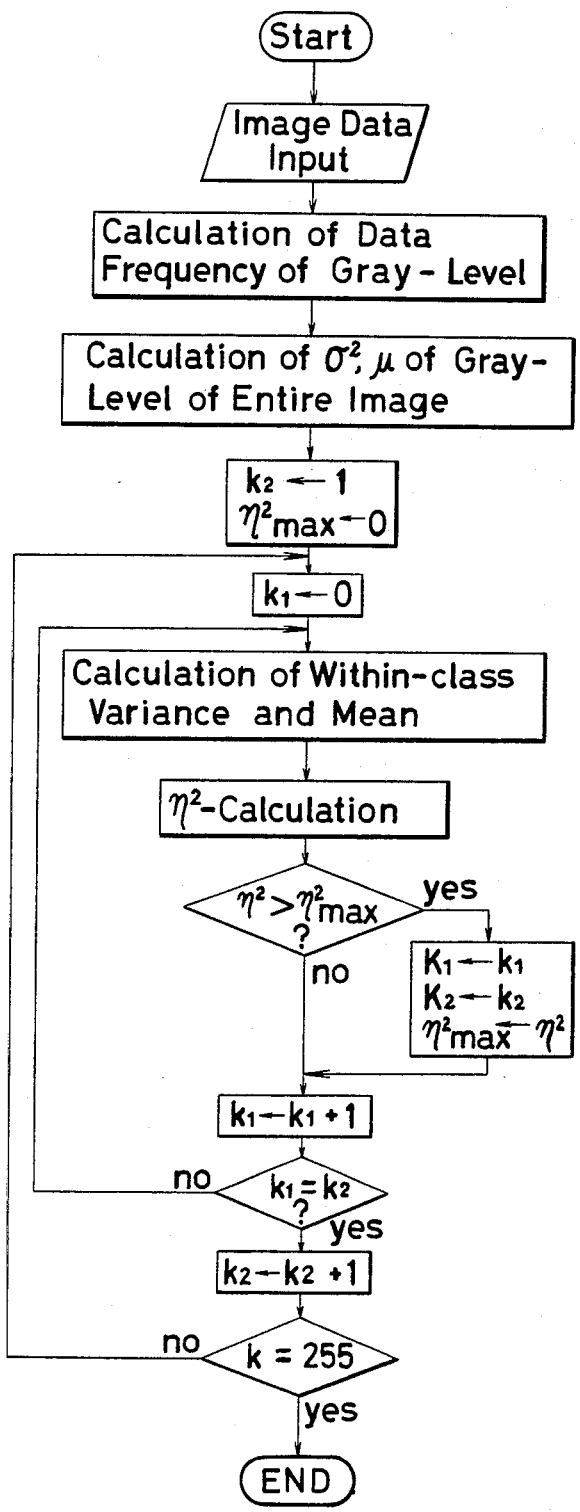
Fig_3(A)
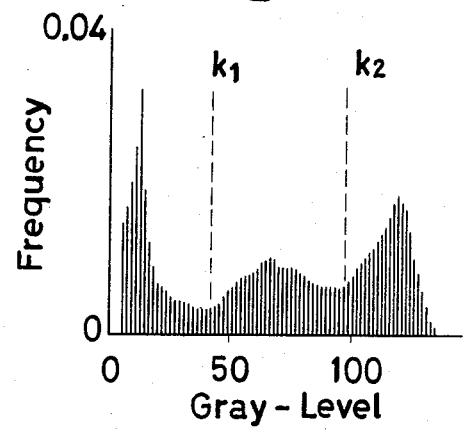
Fig_2
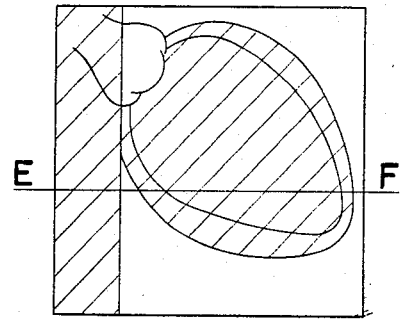
Fig_4(A)
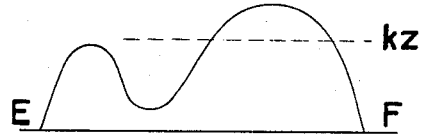
Fig_4(B)
Fig_4(C)

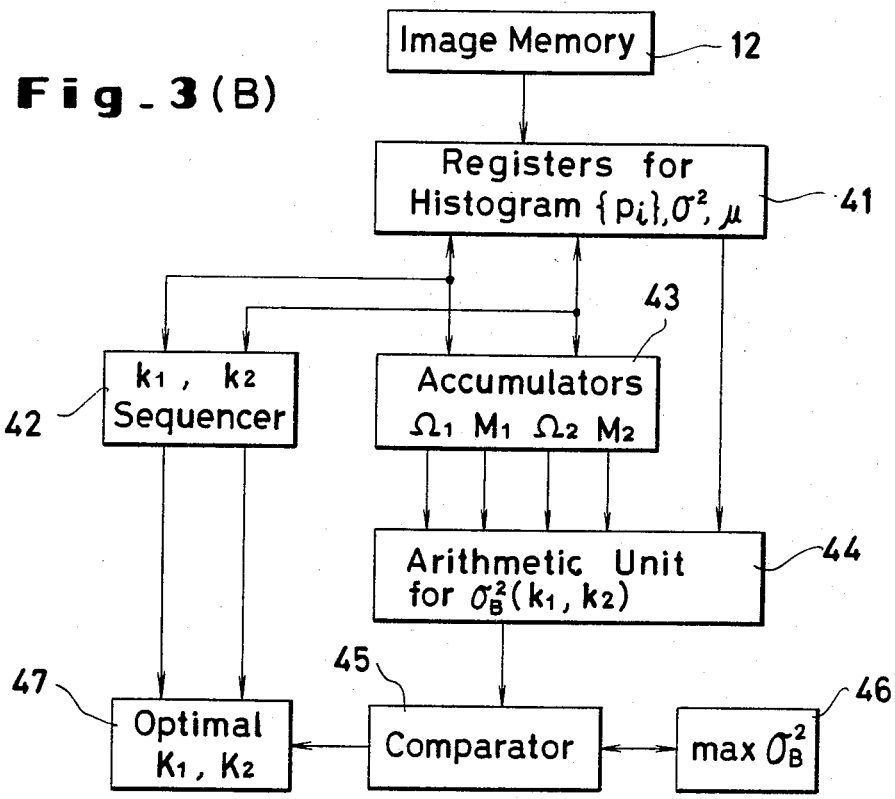
Fig_3(B)
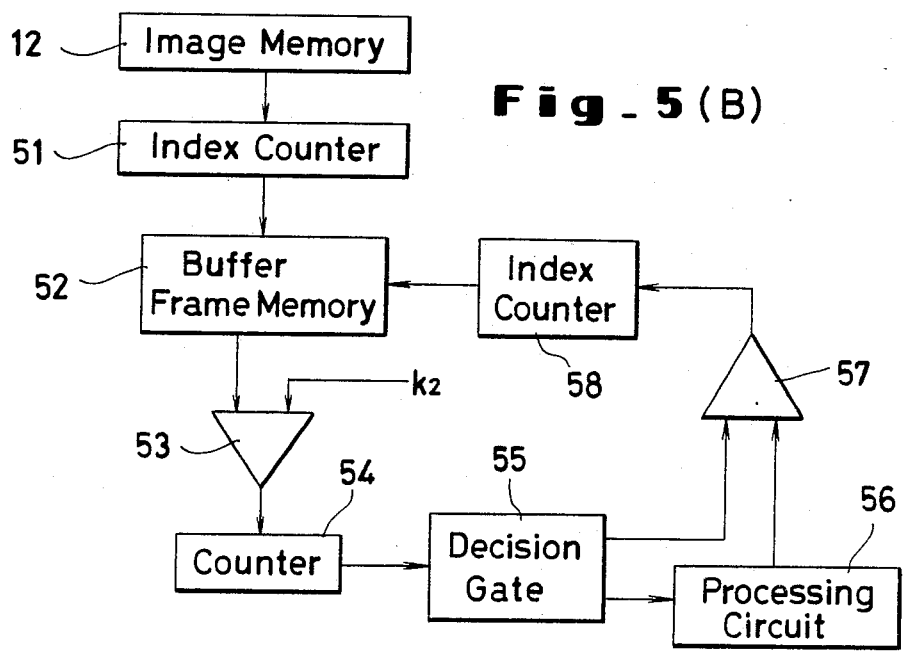
Fig_5(B)

Fig_5(A)
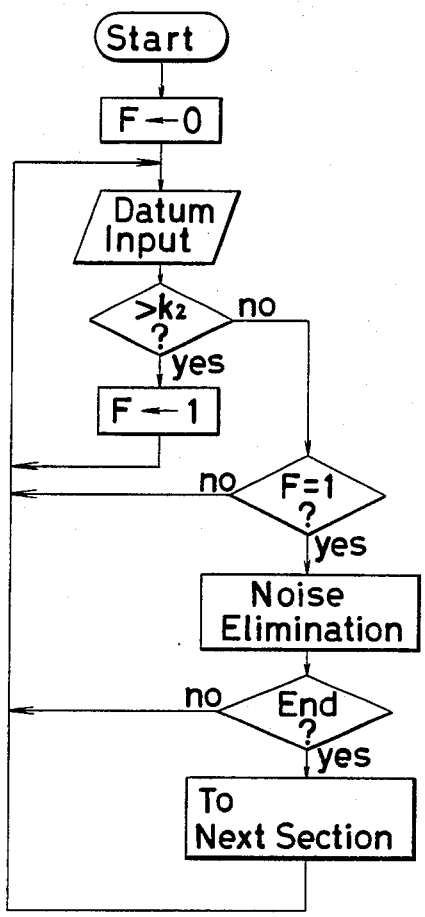
Fig_6(A)
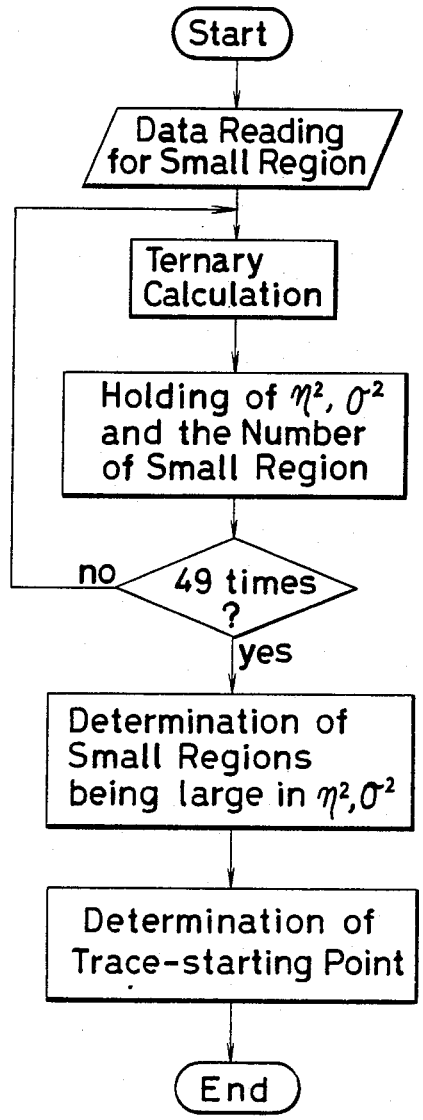
Fig_6(C)
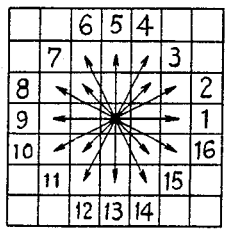

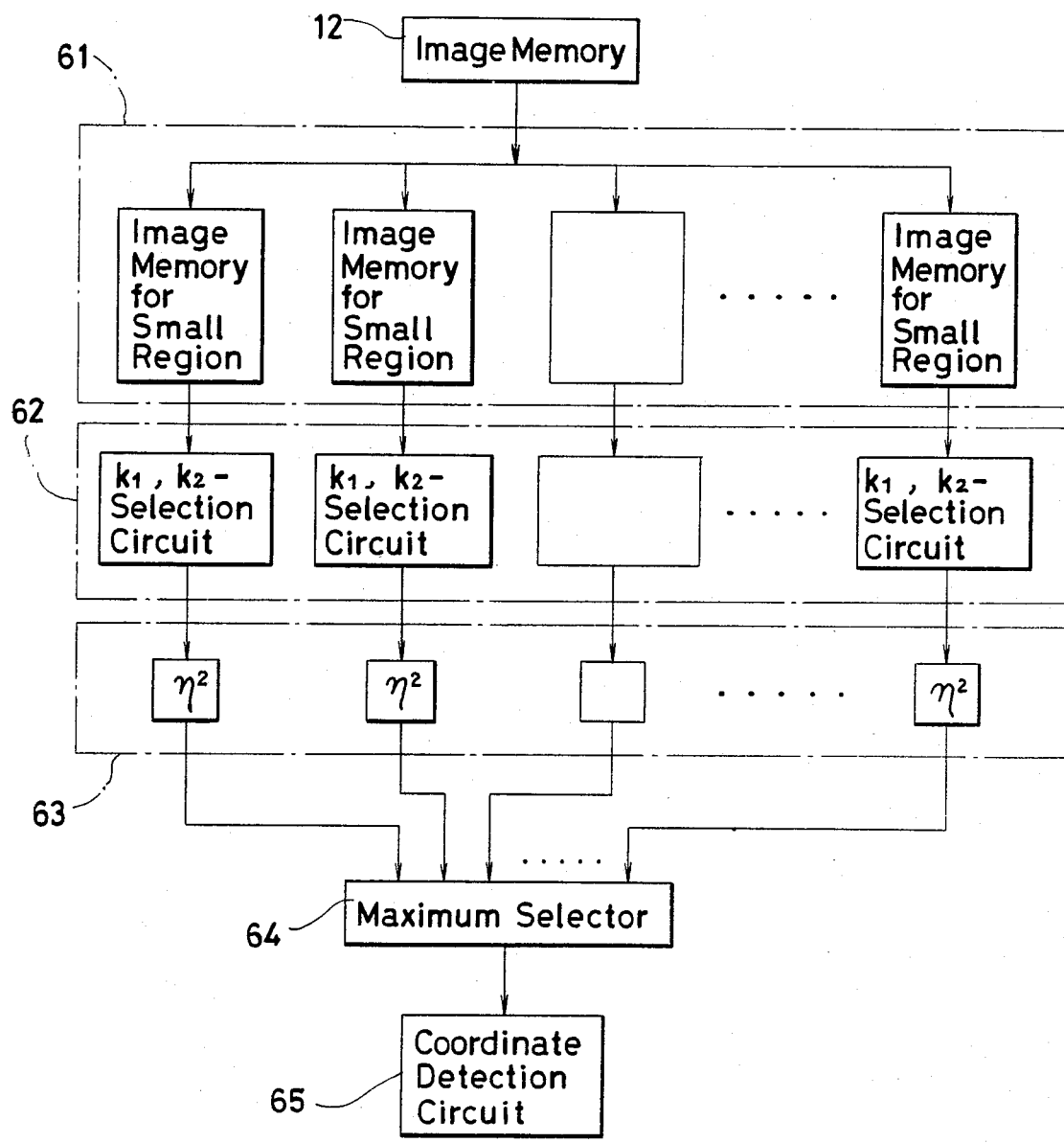
Fig_6(B)

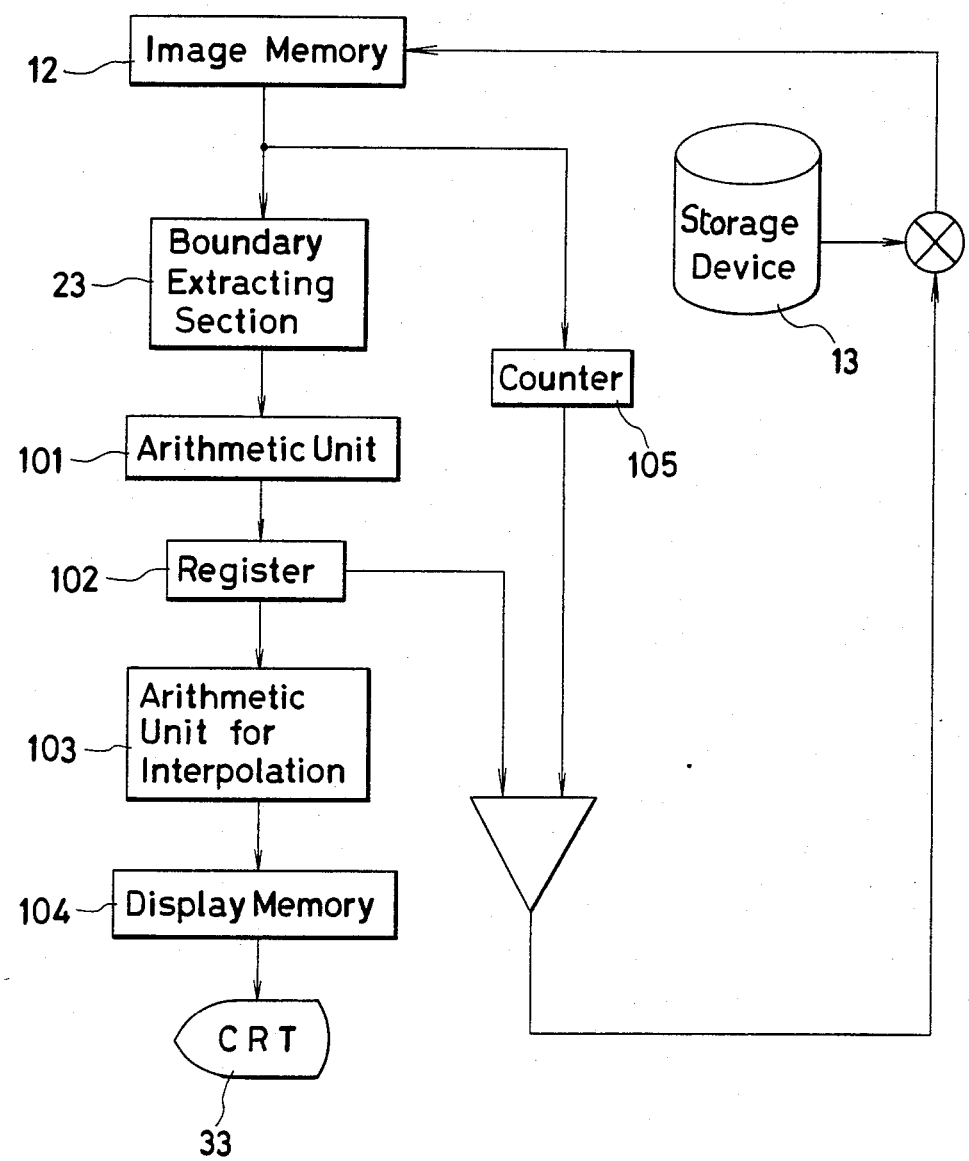
Fig_10

Fig_11
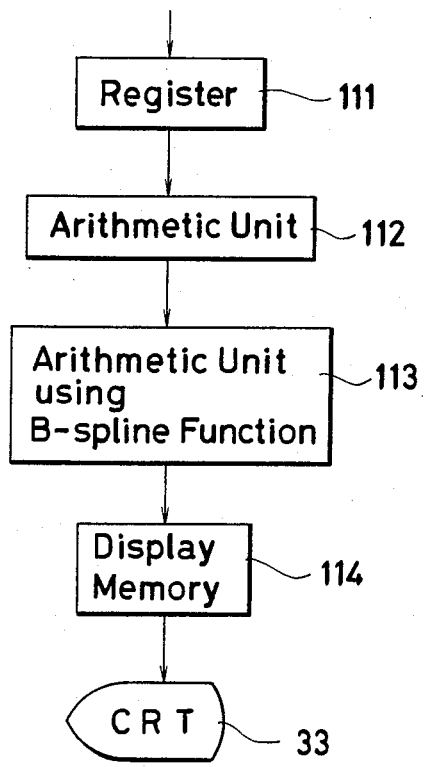
Fig_12(A)  Fig_12(B)  Fig_12(C)
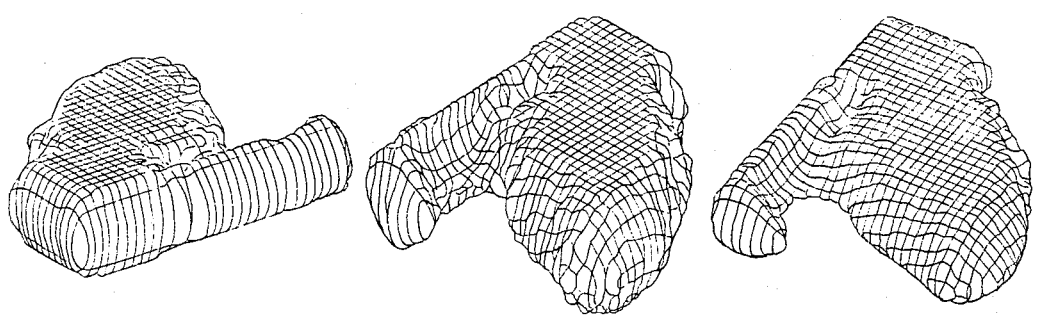

MEDICAL IMAGE PROCESSOR

BACKGROUND OF THE INVENTION

The present invention relates to an image processor for digital-analyzing various gray-level images to obtain required image information and particularly to an image processor which can automatically extract, accurately and promptly, the boundary of images of organs or the like or other image information from images such as X-ray projections of a part of a living body or the like which are extremely low in resolution and low in contrast.

In the computer tomography (CT) which has recently achieved a great effect in medical diagnosis, it becomes possible to obtain a tomographic image of a living body with high resolution, which has not been obtainable with conventional X-ray images, by analysis by use of a computer. However, in the CT device, the living body must be scanned by X-rays at least for a few seconds to obtain a single tomographic image. This means that it is absolutely impossible for the CT device to obtain an image, for example, of a heart or the like which normally repeats its pulsation at short intervals of, say, about one second. Under these circumstances, the movement of the heart has been subjected to continuous projection under X-ray irradiation to obtain X-ray projections required for diagnosis. However, since the projections thus obtained have low resolution, it has not been possible to successfully obtain an accurate boundary of an organ or image information required for various diagnoses. Thus, for example, when an accurate boundary of the image is required, the boundary has been reproduced by tracing the image by hand. This method, however, has disadvantages in that the boundary is imprecise and it takes excessive time to obtain the boundary.

There has been proposed a subtraction method of extracting a moving part of image from the difference between successive two frames obtained from the image signal from a television camera. In this method, however, it is difficult to obtain less-movable parts of images to which a sufficiently great differential signal is not applied, for example, such as a portion in the vicinity of an aortic valve, a portio infract, etc.

Other methods of extracting a boundary of an image so far proposed include a method of primary-differentiating the global image to use a portion having a large value as a boundary (Fujimura, "Line Depiction of Edges of a Gray-level Figure by Local Parallel Processing", in Japanese, Information Processing, 17-7, p. 625, July 1976) and a method using a secondary differentiation instead of the primary differentiation (Sakai et al. "Processing of Gray-level Images by Electronic Computer - Photograph of Face", in Japanese, JIEC (C), 54-C, 6, p. 445, June 1971). A further proposal of a method for the local extraction by differentiation has been made by A. Rosenfelt, ("A Nonlinear Edge Detection Technique" Proc. IEEE, 58-5, p. 814, May 1970.) Since such image processing methods by differentiation depend on local information in the image, it is liable to be affected by noise in the image and to disadvantageously lose the global information.

Another image processing method has been proposed which comprises setting a certain threshold on the basis of desnity of the global image, converting the gray-level at each point of the image into binary data, and extracting a binary boundary in the binary image as a contour. This image thresholding method can be classified depending on the way for establishing the threshold. One method proposed for establishing the threshold comprises dividing the global image plane into small regions, approximating a histogram in each small region by the sum of two normal distributions, and setting a threshold by a statistical procedure thereby to extract a boundary (C. K. Chow & T. Kaneko, "Automatic Boundary Detection of the Left Ventricle from Cineangiograms", Computers & Biomedical Research 5, pp 388–410, 1972). While this method positively uses a statistical theory and is considered to be ideal, it nevertheless poses various problems as described below. First, the gray-level histogram of an image is not always approximated by two normal distributions. The conditions for thresholding are determined only by the values of two peaks and a valley on the histogram and are unstable. Since the boundary is extracted only by pointwise thresholding of gray-levels of the image, it is liable to be affected by noise, and the boundary becomes complicated and inaccurate. It is useless to apply thresholds to all the small regions for the binary thresholding. There is a disadvantage that it requires much computation time for estimating parameters of normal distributions.

Studies on the extraction of boundaries in medical image processing further include reports from Suenaga et al, "Range Filter for Detection of Variation in Local Density of Gray-Level Image" (JIEC, A71-105, Jan. 1972); Fukushima et al, "Extraction of Edge of X-ray Projection of Stomach" (Medical Electronics and Bioengineering, Vol. 15, No. 6, pp. 7-, Oct. 1977); and Yamura et al, "Extraction of Left Ventricular Contour from Projected Image of RI Blood-Vessel" (Medical Electronics and Bio-engineering, Vol. 14, No. 6, pp 452-, Dec. 1976). These are also roughly divided into a local procedure by differentiation or tracing and a global procedure by thresholds of gray-level, as described hereinbefore. These procedures involve points which are insufficient for clinical application since the former is liable to be affected by noise and prevented from obtaining the global information and the latter is not easy in determination of the threshold and has not established a way which can cope with shaded images and with complicated images.

SUMMARY OF THE INVENTION

One object of the present invention is to provide an image processor capable of carrying out digital processing of various kinds of gray-level images to accurately produce required image information, and particularly, to provide an image processor capable of extracting a boundary of even a part of a living body such as a rapidly moving left ventricle which has been heretofore difficult to apply image processing from an X-ray projection, thereby to accurately obtain at high speed, image information for a calculating the cavity volume, a three-dimensional reconstruction view, and a centroid movement view of the left ventricle, for example.

To achieve the aforementioned object, the image processor in accordance with the present invention comprises an image input circuit for subjecting input gray-level projections to analog-to-digital conversion into image signals given in terms of binary bits and once storing the digital image signal thus obtained, an image processing circuit for forming the image signal from the image input system into a ternary code by a gray-level histogram thereof extracting a boundary of the intended part on the basis of the ternary image and integrating the gray-level value within the extracted boundary thereby to calculate the volume and a centroid of the part corresponding to the interior of said boundary line, and an output circuit for displaying information such as the boundary, volume and centroid obtained by the image processing system.

The extraction of the image boundary from the provided processed image is accomplished by segmenting a given image into a plurality of small regions, forming these small regions into ternary coded signals in comparison with thresholds $k_1$ and $k_2$, representing the respective segmented image portions by 0 when the gray-level thereof in histogram is lower than $k_1$ and higher than $k_2$ and maintaining them unchanged when their gray-level falls in the range of from $k_1$ to $k_2$ consequently to obtain the maximum gradation in gray-level among the segmented image portions, and tracing the boundary in a direction perpendicular to the maximum gradation. As one example, X-ray projections of the left ventricle of a living body are provided as a processed image for physical diagnosis. In this case, information such as the volume, three-dimensional view and centroid movement view of the left ventricle can be obtained by the gray-level method based on the gray-level of a given image.

BRIEF EXPLANATION OF THE DRAWINGS

FIG. 1 is a block diagram of an image processor in accordance with the present invention;

FIG. 2 is a histogram obtained from gray-level values of given X-ray projections;

FIG. 3(A) is a flow chart of a ternary process in the image processor in accordance with the present invention;

FIG. 3(B) is a block diagram for determining thresholds for ternary coding process in the image processor in accordance with the present invention;

FIGS. 4(A)–4(C) are explanatory diagrams for explanation of the principle of the pretreatment in the present invention;

FIGS. 5(A) and 5(B) are a flow chart and a block diagram for carrying out the pretreatment;

FIGS. 6(A) and 6(B) are a flow chart and a block diagram, respectively, of the operation process for detecting a boundary trace-starting point in accordance with the present invention;

FIG. 6(C) illustrates the boundary tracing directions in a calculation section in accordance with the present invention;

FIG. 10 is a block diagram of a volume calculation section;

FIG. 11 is a block diagram of a three-dimensional display circuit; and

FIGS. 12(A)–12(C) are three-dimensional views from three directions of the left ventricle obtained by the image processor in accordance with the present invention.

DESCRIPTION OF THE PREFERRED EMBODIMENTS

Figure 7A:
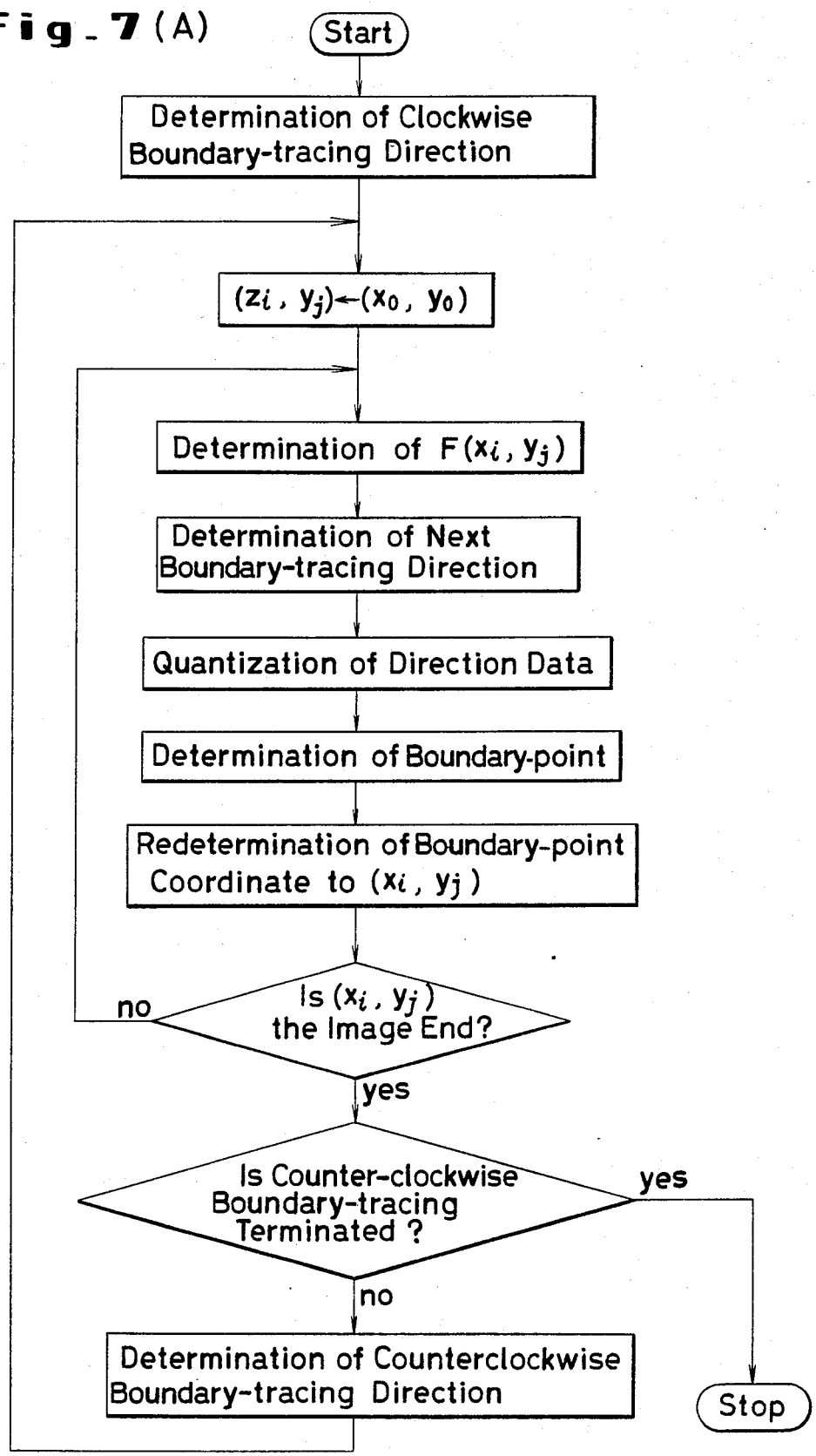
FIGS. 7(A) and 7(B) are a flow chart and a block diagram of the calculation section for the boundary tracing direction in accordance with the present invention.

The present invention relates to an image processor for obtaining required image information from various gray-level images, and particularly, to an image processor which can, particularly in medical diagnosis, automatically extract accurately and promptly a boundary of a specific part from an X-ray projection of a living body and obtain image information including volume information and a three-dimensional view of the imaged body. In the following, the case will be described in which the X-ray projections of the left ventricle is used as one example of the gray-level image applied to the image processing to extract the boundary, volume, three-dimensional (3D) view and centroid movement view of the left ventricle. FIG. 1 is an explanatory block diagram of the image processor of the present invention for obtaining this image information.

The image processor in accordance with the present invention comprises an image input circuit 10, an image processing circuit 20 and an image information output circuit 30, as shown in FIG. 1.

The image input circuit 10 has the same structure as that of a common image input device, which comprises an analog-to-digital (A/D) converter 11 which takes X-ray projections by means of a television (TV) camera or quantized projections obtained from a video tape recorder, an image memory 12 which stores images one by one of signals quantized by the A/D converter 11, and a storage device 13 such as a magnetic disc device which stores the quantized signals once stored in the image memory 12.

The image processing circuit 20 receives image data from the input circuit 10 to have them subjected to digital image processing thereby obtaining the required image information. The image processing circuit 20 comprises a ternary section 21 for forming the image data from the input circuit 10 into a ternary code on the basis of the histogram thereof, a pretreatment section 22 for removing unnecessary image portions from the given image, a boundary extracting section 23 for extracting a boundary of a desired part out of the input image, a centroid point calculation section 27 for obtaining the centroid of said desired part, and a volume-and-3D view calculation section 28 for obtaining the volume and the 3D view of the desired part.

The output circuit 30 which suitably outputs various information obtained by the image processing circuit 20 comprises a plane memory 31 for storing figures, graphs, etc., a recording device such as a character memory 32 for storing characters, and a display device 33 such as a cathode-ray tube (CRT) for displaying, in combination, the contents of the memories 31, 32 and the image memory 12 and the information delivered from the processing circuit 20.

Various component elements of the image processing circuit 20 will be described in detail hereinafter.

When the X-ray projections of low contrast are converted into a binary form to extract a boundary of a specific part, it has been difficult to obtain an accurate boundary. In the case of a desirable gray-level histogram of gray-level images which has two peaks on both sides of a definite valley, the boundary of the specific part in the image can accurately be obtained with ease even by determining a threshold at a level corresponding to the valley in the gray-level histogram. However, in practice, it has been difficult to detect the valley in the gray-level histogram of the X-ray projection.

The X-ray projection of the left ventricle can be roughly segmented into three regions, i.e., the interior of the left ventricle, the papillary muscle and the lung field as a background, depending on the difference in the X-ray absorption factor, and therefore, the ternary threshold is more suitable than binary thresholding.

In a method for approximation of a gray-level histogram as a combination of three normal distribution curves, in most cases, it is difficult to assume three normal distributions from the histogram of an image low in contrast, resulting in a lack of accuracy. Also, even in another ternary method, it is impossible to automatically determine a threshold in a stabilized manner and it has required much processing time. For this reason, no effective ternary method has been available for the image processing.

In view of the foregoing, in the present invention, a non-parametric procedure based on discrimination analysis is applied to the ternary to accurately and promptly obtain two optimum thresholds in a stabilized manner.

Discrimination analysis is a method which stresses the class separation of data X consisting of G number of classes. Here, the data X is each gray-level i (i=0, ..., L-1; for example, L=256 in case of 8-bit) obtained from the image, and the G number of classes means three regions obtained by dividing the gray-level histogram by two densities (thresholds $k_1$, $k_2$), that is, sections $S_1 = [0, k_1]$, $S_2 = [k_1+1, k_2]$ and $S_3 = [k_2+1, L-1]$.

Referring to FIG. 2, let $\mu_j (j=1, 2, \ldots G)$ be the mean gray-level of each class in the histogram divided into three classes, and $\mu$ be the mean gray-level in the entire histogram, the gray-level variance $\sigma^2$ of the entire image is given in division by the following equation:

$$\sigma^2 = \sum_{j=1}^{3} \omega_j \cdot \sigma_j^2 + \sum_{j=1}^{3} \omega_j (\mu_j - \mu)^2 \quad (1)$$

where $\omega_j$ is the rate of class j with respect to the entire image (the frequency of occurrence); and $\sigma_j^2$ is the variance of class j.

On the right side of equation (1), the first term means the variance within the mean class, which is called "within-class variance", and the second term means the variance between the classes, which is called "between-class variance". That is, as is understood from equation (1), the total variance is expressed by the sum of the within-class variance and the between-class variance. If the within-class variance is small while the between-class variance is large, the classes are well separated from each other, which serves as a reference for appraising the optimum property of the threshold which divides the G number of classes. That is, the separation degree $\eta^2$ of class showing the separation state between the classes is given by the following equation:

$$\eta^2 = \sigma_B^2 / \sigma^2 \quad (2)$$

where $\sigma_B^2$ is the between-class variance.

Thus, since the separation degree $\eta^2$ shown in the equation (2) is the maximum, that is, $\sigma^2$ is constant as being given, the optimum threshold may be obtained in a sense of providing the optimum class separation with two thresholds $k_1$, $k_2$ which make $\sigma_B^2$ maximum.

The determination of thresholds for the ternary processing will be described in connection with FIG. 3(A), a flow chart. The image data such as X-ray projections are inputted, a gray-level histogram Pi thereof is prepared and the variance $\sigma^2$ of the gray-level of the entire image and mean gray-level $\mu$ are precalculated. The thresholds are determined so that the separation degree $\eta^2$ is made maximum on the basis of the thus obtained histogram of the gray-level and the whole variance and overall mean, that is, the gray-level is concentrated on the mean within the class to provide a marked difference between the classes, and each image element is subjected to the ternary processing.

FIG. 3(B) shows a schematic structure of one example of a circuit for determining a ternary threshold in the ternary section.

The gray-level i of each image element of the given images is received from the image memory 12 to obtain the normalized histogram Pi, the overall mean gray-level $\mu$ and the whole variance, which are stored in a register 41. Actually, the normalized histogram is obtained by dividing the number of image elements in each gray-level i of the image by the total number of image elements. The normalized histogram Pi of the register 41 is read by $k_1$, $k_2$-sequencer 42 ($k_1$, $k_2$ are moved under the conditions of $0 \leq k_1 < k_2 < L-1$ from density level 0 to L-1), and fed to an accumulator 43. In the accumulator 43, there are accumulated 0 and primary moments of the normalized histogram:

$$\left. \begin{array}{l} \Omega_1 = \sum_{i=0}^{k_1} P_i, \; M_1 = \sum_{i=0}^{k_1} i \cdot P_i \\ \Omega_2 = \sum_{i=0}^{k_2} P_i, \; M_2 = \sum_{i=0}^{k_2} i \cdot P_i \end{array} \right\} \quad (3)$$

which are delivered to the operation section 44.

The operation section 44 successively calculates the between-class variance $\sigma_B^2 (k_1, k_2)$ to be maximized from four values $\Omega_1$, $M_1$, $\Omega_2$, $M_2$ from the accumulator 43 in consideration of the overall mean gray-level $\mu$ from the histogram register 41.

$$\left. \begin{array}{l} \omega_1 = \Omega_1, \; \mu_1 = M_1/\Omega_1 \\ \omega_2 = \Omega_2 - \Omega_1, \; \mu_2 = (M_2 - M_1)/\omega_2 \\ \omega_3 = 1 - \Omega_2, \; \mu_3 = (\mu - M_2)/\omega_3 \end{array} \right\} \quad (4)$$

If the value calculated by the accumulator 43 is larger than the previous maximum value, the content of the register 46 is renewed to a larger content and at the same time the thresholds $k_1$, $k_2$ at that time are registered in an optimal threshold register 47. Thus, upon termination of the sequence of the thresholds $k_1$, $k_2$, the optimal thresholds $K_1$, $K_2$ and $_{max}\sigma_B^2$ may be obtained.

The above-mentioned ternary method in accordance with the reference of discrimination analysis is very much simpler than the approximation of normal distribution, and the $k_1$, $k_2$ may be determined. Also, $\Omega_i$, $M_i$ need not be recalculated every time $k_1$, $k_2$ are changed and they may be calculated accumulatively to shorten calculation time. Further, this method can determine the optimal thresholds $K_1$, $K_2$ and at the same time, can appraise the ternary by calculating $\eta^2$ from the maximal value $_{max}\sigma_B^2$. It is assured that when the projection of the left ventricle provided by the aforesaid method is formed into the ternary code, it is definitely divided into three regions, i.e., the interior of the left ventricle, the internal wall portion of the papillary muscle or the like, and the lung field as a background thereof.

Next, the pretreatment section 22 will be described. The term "pretreatment" used herein is for removing unnecessary images such as backgrounds other than the required parts from the given projections as previously mentioned. For the purpose of explaining the principle of the pretreatment, FIG. 4(A) schematically illustrates a projection of a left ventricle as a commonplace example. For example, the gray-level distribution in section E-F is as shown in FIG. 4(B). In a typical case, it comprises a density peak of the left ventricle and a density peak of a spinal column or the like. Three or more peaks sometimes appear but the gray-level of the image of the left ventricle with a contrast media injected thereinto is excessively high as compared with that of other parts. To remove the spinal column on the E side, the aforementioned threshold $k_2$ obtained by the ternary is used to compare the density of the image elements from the section F to E. Upon termination of comparison of one section, the peak (spinal column) of the density smaller than $K_2$ may be removed by regression analysis (FIG. 4(C)).

FIG. 5(A) is a pretreatment flow chart, which will be described with reference to a block diagram of the pretreatment section shown in FIG. 5(B). First, an index counter 51 is initialized to transfer an 1 frame (in section) of the provided image plane from an image memory 12 to a buffer memory 52. An image signal successively outputted from the buffer memory 52 is compared with the threshold $k_2$ at a comparator 53, and image elements greater than $k_2$ remain, and such an operation is repeatedly carried out. The frequencies of changes from 0 to a certain value (F to E) or the reversal thereof at the frame memory 52 are measured at a counter 54. Whether or not two or more portions greater than $k_2$ are present is judged by a decision gate 55 from the number measured at the counter 54. If two or more portions are present, one having a greater width remains, and the portion of density smaller than $k_2$ is directly removed by the regression analysis. Said regression analysis and the resultant separation of one image plane are carried out by the processing section. A comparator 57 decides whether or not the operation of the high gray-level image information from the gate 55 or processing section 56 is terminated with respect to the whole frame of one image plane portion, and if not, a command is fed from an index counter 58 to the buffer frame memory 52 so as to achieve the processing of the next frame and such command is repeatedly produced until it is terminated.

Unnecessary background images are removed from the thus provided images, and the detection of the boundary trace-starting point is effected prior to the application of the boundary tracing process for obtaining a boundary of an image which is the subsequent object.

This detection of the boundary trace-starting point is carried out by a circuit 24 in a boundary extraction section 23. This structure and its method of processing will be described in connection with a flow chart of FIG. 6(A) and a block diagram of FIG. 6(B).

An image in the image memory 12 is segmented into small regions longitudinally and laterally so that the regions are partly overlapped with each other. That is, the image is segmented, for example, into 7×7 small regions, so that longitudinal and lateral adjoining regions overlap each other. Such a segmentation of the image into small regions is carried out by a circuit 61. Next, for each of 49 small regions defined as one example, the ternary, the aforesaid separation degree $\eta^2$ of the gray-level histogram and the whole variance $\sigma^2$ are obtained. This processing is carried out by a ternary circuit 62 in FIG. 6(B), but actually, the ternary circuit 21 in FIG. 3 can be used. The separation degree $\eta^2$ of each of the regions which have thus been formed into the ternary code are stored in the memory 63 and the maximum value of the largest region remains in the selector 64. In the subsequent coordinate detection circuit 65, the coordinate of an image element nearest to the center of the region whose $\eta^2$ is largest is detected as a boundary trace-starting point. The trace-starting point is selected within the region where the variance $\sigma^2$ and separation degree $\eta^2$ are large for the reason that, as previously mentioned in the ternary section, in the image in the vicinity of the boundary is roughly divided into three density portions, i.e., the left ventricle, the papillary muscle and the lung field, and therefore the $\eta^2$ of the ternary is large and the density distribution is wide so that the variance becomes increased.

Next, in the boundary tracing direction calculation section 25 which is a two dimentional differential type digital filter which actually carries out the boundary tracing, the maximum gradation of gray-level is obtained from the point extracted by the extraction processing of said boundary trace-starting point to trace the boundary in a direction at a right angle with respect to the first-mentioned direction. Here, let $x_o$, $y_o$ be the coordinates of points on the image, and $f(x_o, y_o)$ be the gray-levels at said points, the maximum gradation of density $(x_o, y_o)$ is expressed by:

$$E(x_o, y_o) = \tan^{-1}\left( \frac{\partial f(x_o, y_o)}{\partial y} \bigg/ \frac{\partial f(x_o, y_o)}{\partial x} \right) \tag{5}$$

In case of the actual digital processing, in the present invention, the operation of the partial differentiation in equation (3) is carried out as follows to minimize the influence caused by noise.

$$\frac{\partial f(x_o, y_o)}{\partial x} = \frac{\sum_{i=-N}^{N}(x_i - \bar{x})(f(x_i, y_o) - \bar{f}_x)}{\sum_{i=-N}^{N}(x_i - \bar{x})^2} \tag{6}$$

$$\frac{\partial f(x_o, y_o)}{\partial y} = \frac{\sum_{i=-N}^{N}(y_i - \bar{y})(f(x_o, y_i) - \bar{f}_y)}{\sum_{i=-N}^{N}(y_i - \bar{y})^2} \tag{7}$$

Image elements used in these operations are the ±N image element portions in directions of axes X and Y about $(x_o, y_o)$. However, $\bar{f}_x$, $\bar{f}_y$ in equations (6) and (7) are given by the following equations:

$$\bar{f}_x = \frac{1}{2N+1} \sum_{i=-N}^{N} f(x_i, y_o) \tag{8}$$

$$\bar{f}_y = \frac{1}{2N+1} \sum_{i=-N}^{N} f(x_o, y_i) \tag{9}$$

The boundary tracing direction is the direction at a right angle with respect to the $E(x_o, y_o)$, that is, $$F(x_o, y_o) = E(x_o, y_o) + \frac{\pi}{2} \tag{10}$$

In the present invention, the tracing direction is quantized. For example, the drawing showing the tracing direction quantized in 16 directions is FIG. 7(A), and the quantized direction D is obtained by the following equation:

$$D = \left\{ \left( F(x_o, y_o) + \frac{\pi}{16} \right) \frac{\pi}{8} \right\} + 1 \tag{11}$$

Figure 7B:
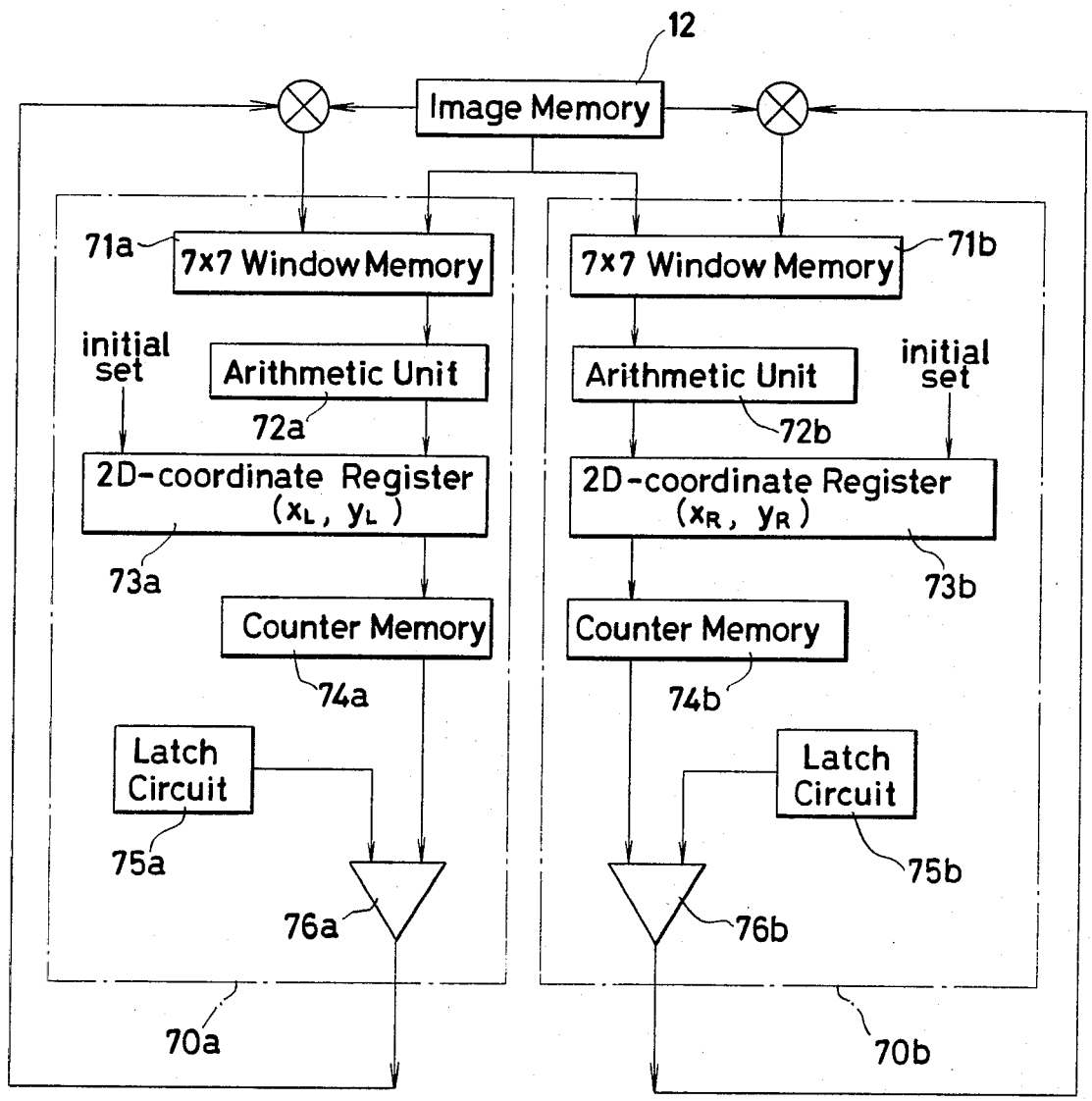

FIG. 7(B) is a flow chart showing the boundary extraction processing, and FIG. 7(C) is a block diagram therefor. The boundary extraction processing will be described with reference to these figures.

In this embodiment, the image from the image memory 12 is segmented into longitudinal and lateral 7×7 small regions, which are respectively stored into two small-region window memories 71a and 71b. The memory 71a is for the clockwise boundary tracing, and the memory 71b is for the counterclockwise boundary tracing. If the tracing is started clockwise, a signal is fed from the memory 71a of a clockwise boundary point detection circuit 70a to an operation section 72 to determine the maximum gradation of density by said equation (5) and obtain the direction at a right angle with respect to the maximum gradation. It is noted that the operation section 72a determines the clockwise right-angle direction and the operation section 72b determines the counterclockwise right-angle direction. In the operation section 72a, each right-angle direction is quantized in 16 directions as in FIG. 6(B) to obtain the next boundary point. The coordinate of the thus obtained next boundary point is renewed in a two-dimensional coordinate register 73a. In this manner, the boundary is traced to successively store coordinate points in the boundary memory 4a. The read coordinate signal is compared by a comparator 76a with the coordinate value for deciding the end of the image fed from a latch circuit 75a, and when the image end is traced, the tracing direction of the boundary is reversed and the counterclockwise boundary point detection circuit 70b is actuated to trace the boundary up to the image end by the same operation as that of said circuit 70a. When the boundary is traced counterclockwise up to the image end, the boundary extraction processing is terminated.

Next, the aortic valve extraction section 26 will be described. Here, the boundary extracted by the two-dimensional digital filter is used to effect the aortic valve extraction processing. First, a constriction of a blood outlet of the left ventricle which is said to be the characteristic of the aortic valve is extracted by the amount of variation of the direction code when the boundary is traced. That is, let $D_i$ be the direction code, the amount of variation $\Delta D$ between $D_i$ and $D_i+1$ is obtained from the following operation.

$$\Delta D = MOD_{16}(MOD_{16}(D_i+1 - D_i + 16)) - 8 \tag{12}$$

Figure 8A:
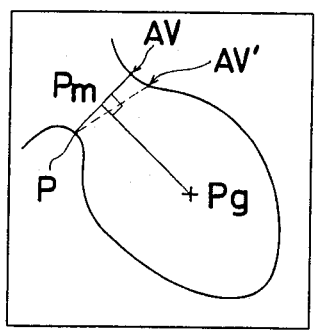
FIGS. 8(A)–8(C) illustrate the principle for detecting a constriction at which an aortic valve portion of the left ventricle is positioned in accordance with the present invention.
Figure 8B:
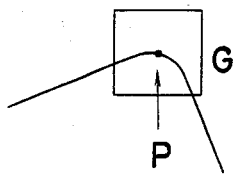
Figure 8C:
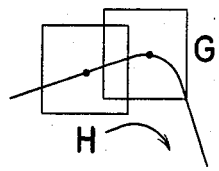

This is the case where the direction is quantized in 16 directions, and $MOD_{16}$ means the remainder resulting from the division of the contents in parentheses by 16. After one constriction point has been obtained, a straight line which makes the lateral diameter of the blood outlet of the left ventricle shortest is made to form temporarily an aortic valve. This temporarily decided valve is used to obtain the centroid of the left ventricle. The method of obtaining said centroid will be described later. Considering the function of the left ventricle, the left ventricle tends, in its diostolic termination to move the centroid towards the center of and perpendicularly to the aortic valve, irrespective of occurrence of any abnormality. In the present invention, as shown in FIG. 8(A), a valve AV' temporarily drawn by utilization of the aforesaid property is readjusted to obtain the position of an adjusted valve AV. That is, adjustment is made so that a line connecting the middle point Pm with the centroid Pg is made at a right angle to the valve. The aforementioned processing is carried out in the diostolic termination at which the characteristic of the aortic valve tends to be pronunced, and in the following detection of constrictions, the constrictions are successively extracted using the correlation function on the basis of the density in the vicinity of the first constriction point, and the valve processing is carried out at the same gradation as that of the first valve. The detection of the constriction point by the correlation function is carried out by making use of the fact that the aortic valve bears on the root between the blood vessel and the myocard and thus it is less moved than other parts, that is, the gray-level in the vicinity of the aortic valve does not change much with time. It is supposed that the constriction point of the aortic valve in the diostolic termination is detected in the pretreatment. As shown in FIG. 9(B), in the $n^{th}$ frame of images which are continuous in time, a region G is taken so as to surround a constriction point P. Further, as shown in FIG. 8(C), a region H of the same size as that of the region G is taken on the boundary in the image of the $n+1^{th}$ frame. Then, only the region H is moved along the boundary while the region G remains locked to successively obtain the correlation with the region G, and the highest point resulting therefrom is made to form a constriction point of the aortic valve in said image. The correlation P of the region H to the region G is given by the following operation formula:

$$P = \frac{1}{M \sqrt{P_G} \sqrt{P_H}} \sum_{i=1}^{m} \sum_{j=1}^{n} g_{ij} \cdot h_{ij} \tag{13}$$

where $M = m \times n$, $m \times n$ are the sizes of the regions G and H for obtaining the correlation function, and $g_{ij}$, $h_{ij}$ are the gray-levels of image elements in the regions G and H. The gray-levels $P_G$ and $P_H$ of the regions G and H are given by $$P_G = \frac{1}{N} \sum_{i=1}^{m} \sum_{j=1}^{n} g_{ij}^2 \tag{14}$$

-continued $$P_H = \frac{1}{N} \sum_{i=1}^{m} \cdot \sum_{j=1}^{n} \cdot h_{ij}^2 \quad (15)$$

Figure 8D:
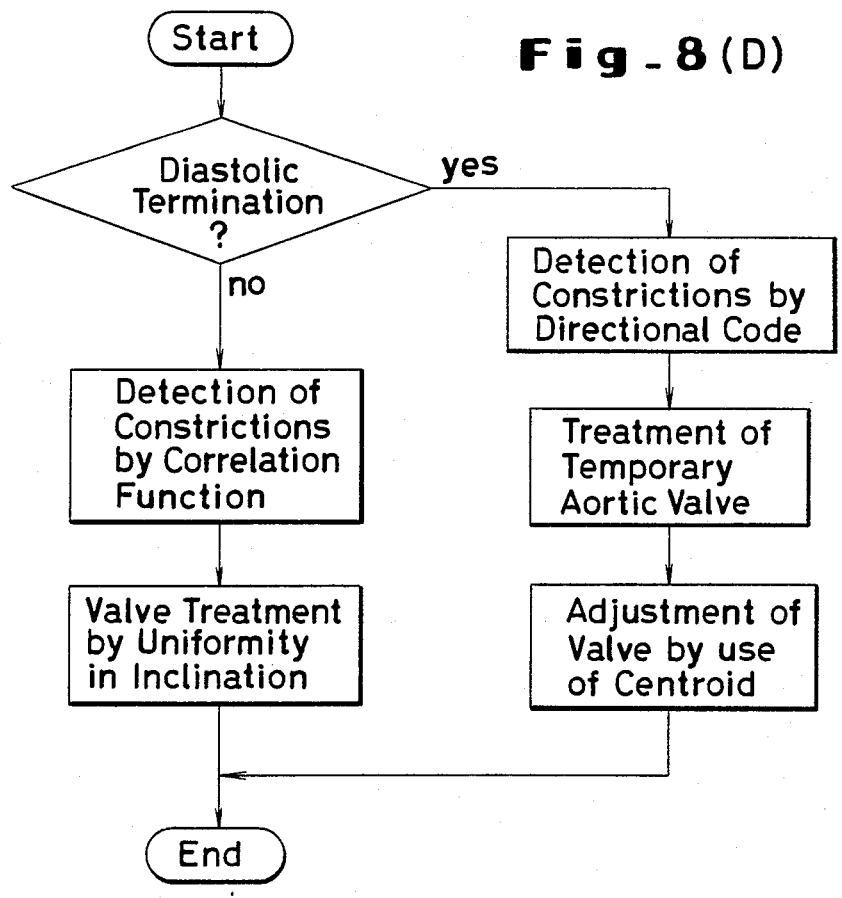
FIGS. 8(D)–8(E) are a flow chart and a block diagram of the operational process in the circuit of an aortic valve extraction section in accordance with the present invention.
Figure 8E:
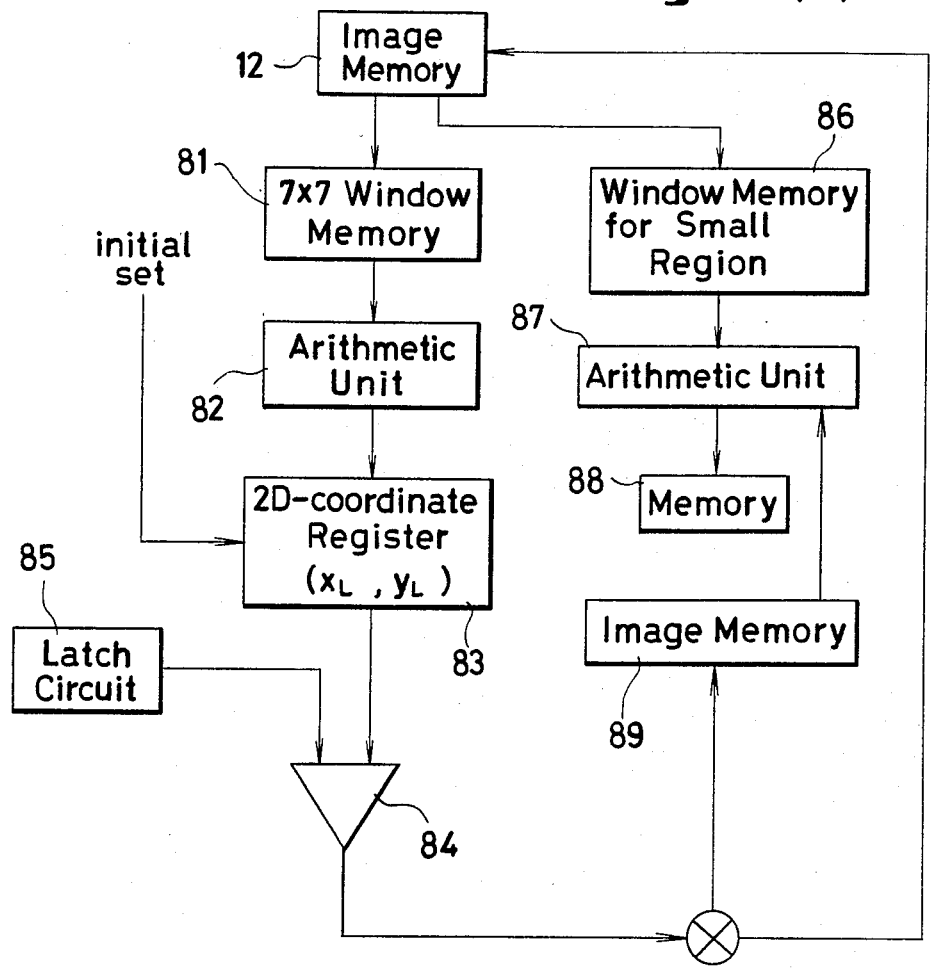

The constriction point of the aortic valve is obtained in the manner as described hereinbefore. The aortic valve extraction section 26 to carry out the aforesaid processing will be described with reference to the flow chart of FIG. 8(D) and the block diagram of FIG. 8(E).

Image information with images in the diostolic termination automatically selected which are formed into a ternary code and having thresholds in the range from $k_1$ to $k_2$ are stored in the image memory 12. This image information is segmented into longitudinal and lateral 7×7 image elements, which are stored in the small region window memory 81, and subsequently, the operation of equation (12) is carried out by the operation section 82 to obtain a coordinate of a constriction point. The thus obtained coordinate of the constriction point is stored in the two-dimensional coordinate register 83 and is sent to the comparator 84. The comparator 84 compares the coordinate value of the constriction point with the value which judges the constriction of the aortic valve from the latch circuit 85 to detect a proper constriction point and the aortic valve is obtained from two constriction points. The thus obtained information of the aortic valve in the diostolic termination is fed to the image memory 89 whereas the images other than those in the diostolic termination to be processed are segmented into the longitudinal and lateral 7×7 image elements from the image memory 12, which are then stored into the small region window memory 86. These image element signals are subjected to the operation of equations (13), (14) and (15) by the operation section 87 to obtain coordinates of the constriction points, which are stored in the memory 88. By the function of correlation of these coordinates of constriction points, positions of the aortic valve at the termination of expansion and portions analogous to images other than those in the diostolic termination comprise an aortic valve.

The complete extraction of boundary can be performed by the aforesaid detection of the aortic valve, whereby the data for appraising ventricle function as described later may be obtained.

First, a centroid point calculation section 27 is provided to obtain a coordinate point of the centroid of the left ventricle. The coordinate points (X, Y) of the centroid may be obtained by $$X = \frac{\int\int xf(x, y)dxdy}{\int\int f(x, y)dxdy} \quad (16)$$

$$Y = \frac{\int\int yf(x, y)dxdy}{\int\int f(x, y)dxdy} \quad (17)$$

Figure 9A:
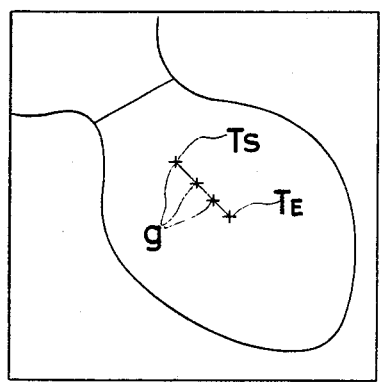
FIG. 9(A) illustrates the movement of centroid point obtained by the image processor in accordance with the present invention.
Figure 9B:
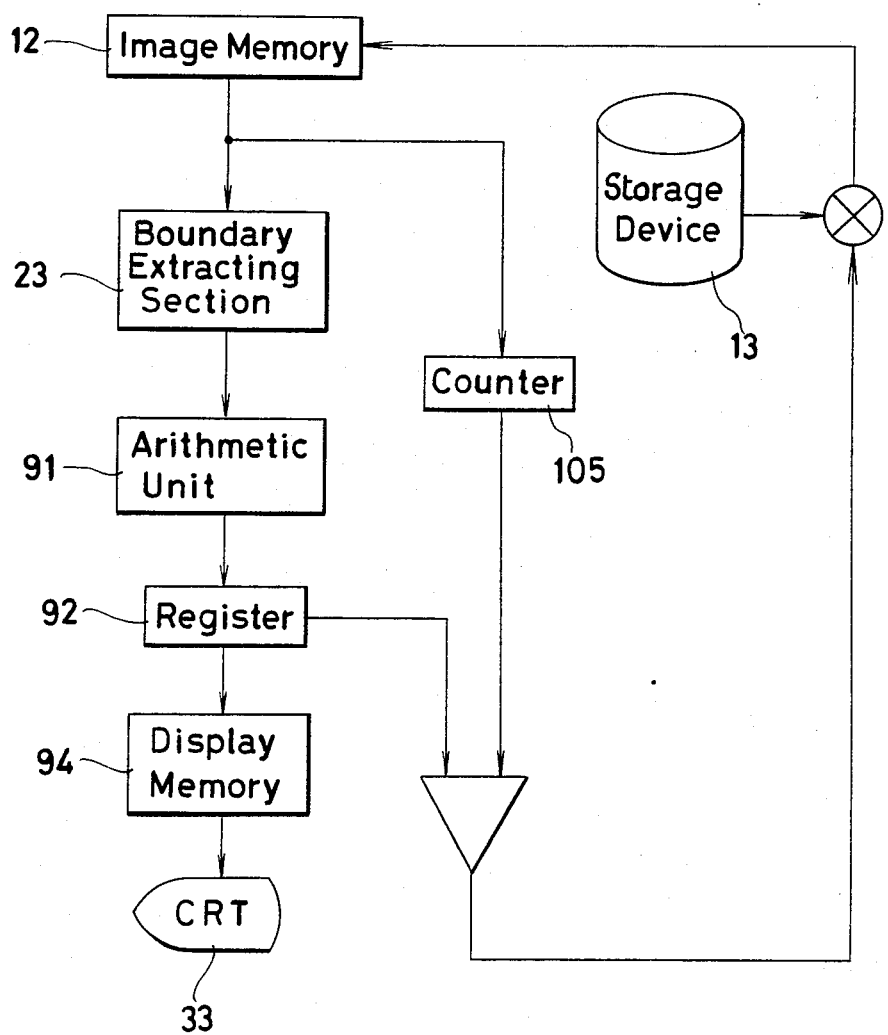
FIG. 9(B) is a block diagram of a centroid point calculation section.

A plurality of centroid points g thus obtained from the diastolic termination $T_E$ to the systolic termination $T_S$ are overlapped on the boundary at the diastolic termination to thereby form a centroid point movement view which is effective for diagnosis as shown in FIG. 9(A).

The centroid point calculation circuit 27 will be described with reference to FIG. 9(B), a block diagram.

The image data for a portion of one period are fed from the image memory 12 to the operation circuit 91 after the boundary has been extracted by the boundary extraction circuit 23, and at the operation circuit, the operation is made by the aforesaid equations (16) and (17) to obtain the centroid points in each image, which are then sent to the register 92. The detection of centroid points in each image is successively carried out by the control of the counter 93 to successively store them in the memory 94, and upon completion of the operation, a process of centroid movement is indicated by arrows on the cathode-ray tube (CRT) with the background of the boundary at the diastolic termination.

Next, in the volume calculation section 28 for the left ventricle, the volume of the left ventricle has been heretofore calculated by rotary elliptic approximation or area sterometry. While these methods are relatively effective in the diastolic termination, they involve a great error at the time close to the systolic termination or in an abnormal heart. Thus, the present invention newly proposes a method called the "Gray-level Method", in which the length of an image in the depth direction is detected depending on the gray-level of the image to calculate the volume of the left ventricle. This method utilizes the relation of the following equation between the incidence amount and emission amount of the X-ray passing through a material maintaining the fixed coefficient of X-ray absorption.

$$I = I_0 \cdot e^{-\mu l}$$

where I is the emission amount of X-ray, Io is the incidence amount of X-ray, $\mu$ is the coefficient of X-ray absorption, and l is the length of X-ray transmission. The aforesaid equation is solved with respect to l as follows:

$$l = \frac{1}{\mu}\left(\log \frac{1}{I} - \log \frac{1}{I_o}\right) \quad (19)$$

Since I can be considered as the gray-level on the X-ray projection, and when the gray-level is measured, this is logarithm converted to have D=log 1/I, then log $1/I_o$ can be regarded as a constant, the above equation (19) may be written as:

$$l = \frac{1}{\mu}(D - a) \quad (20)$$

where a is a constant.

Materials within the left ventricle are only "urografin" and blood which are contrast media, whose coefficient of X-ray absorption is considered constant. Other living body materials are small in the coefficient of X-ray absorption as compared with "urografin" and then can be disregarded. Therefore, in the X-ray projection, if the density within the left ventricle is measured in accordance with D=log 1/I, the depth may be obtained. The method of determining the depth of the left ventricle in a point within the left ventricle on the X-ray film, from the gray-level at said point is the gray-level method herein referred to.

The volume calculation section 20 will be described with reference to the block diagram shown in FIG. 10.

First, an image in the diastolic termination is automatically selected and the image is written on the memory 12. As previously mentioned, in the boundary obtained by the boundary extraction circuit 23, the sum total of densities within the boundary is proportional to the volume, and therefore, the volume is obtained by the operation section 101 and sent into the register 102. This processing is applied to all the images under the control of the counter 103 for storage thereof in the register.

Simultaneously with the termination of the image processing as required, rough data are interpolated to form a smooth curve characteristic in the operation circuit 103, with the abscissa graduated for the time and the ordinate for volume, using the B-spline periodic function. The curve is once stored in the memory 104 and displayed on the CRT 33.

Recording and displaying various kinds of operation results are effected by the output section 30 having a general structure. As one example, the structure indicating the three-dimensional view (FIG. 11) of the left ventricle on the basis of the aforesaid results will be schematically described.

The data on the boundary of the left ventricle automatically extracted from one set of image data written in the image memory is stored in the register 111 and inputted while suitably determining the direction of the visual point. Judgment is made by the operation section 12 on the basis of these input data if the point of each datum is a visible portion or an invisible portion to treat hiding lines. Further, a row of data points constituting a closed curve is extracted by the operation section 113, the data points are directly projected and the coefficient of the period spline is obtained. In this manner, the visible portion in the closed curve is extracted and stored in the memory 114 and then displayed on the CRT 33. As one example, FIGS. 12(A)–12(C) are three-dimensional views as viewed from three directions of the left ventricle obtained by the apparatus in accordance with the present invention, which is found to contain information useful for the appraisal of heart function.

As described in detail hereinbefore, in the present invention, since the image processing is made with the digital image of the ventricular projected image, it is possible to calculate the volume of the ventricle accurately and promptly as compared with the prior art systems.

Moreover, the gray-level method is advantageously used for the calculation of volume so that the volume even for a morbid case where the shape of a rotary ellipse or the like cannot be assumed and for the ventricular image at the last stage of systole may be calculated with less error.

Furthermore, the present invention previously unavailable not only calculates the ventricular volume but also has an output system providing a centroid movement view, and thus they may be used to provide information for more effective diagnosis.

It will be appreciated that the present invention is not limited to the embodiments described and illustrated hereinbefore and the procedure of the present invention may be applied to the X-ray projection of not only the left ventricle but the right ventricle.

What is claimed is:

1. An image processor comprising:
    an image input circuit including an analog-to-digital converter for converting a provided gray-level image into a quantized image signal, and an image memory for successively storing an image on the basis of the quantized image signal from the analog-to-digital converter;
    an image processing circuit including,
    a ternary circuit for producing a ternary code signal based on the quantized signals outputted from the image memory in said image input circuit on the basis of a gray-level histogram,
    a boundary extraction means for extracting a boundary of a measured part within the image to be processed on the basis of the ternary code signal from said ternary circuit and for producing a corresponding boundary signal,
    a volume calculation means for integrating the boundary signal from said boundary extraction means and the value of gray-level within said boundary to produce a volume signal corresponding to the volume of the measured part, and
    a centroid operation means for obtaining the centroid of the measured part on the basis of the volume signal from said boundary extraction means and for producing a corresponding centroid signal; and
    an output circuit including a plane memory for storing at least selected of the signals produced by said image processing circuit and a display device for displaying images corresponding to at least selected of the signals stored in said plane memory.

2. An image processor according to claim 1 wherein said image processing circuit comprises:
    pretreatment means for subjecting the ternary code signal outputted from said ternary circuit to a pretreatment to obtain a variation in gray-level in each outputted ternary code signal over the entirety of the provided image to leave a continuous image element portion having a gray-level above a specific threshold and remove other portions by regression analysis, said ternary code signal being outputted from said pretreatment means to said image memory.

3. An image processor according to claims 1 or 2, wherein said boundary extraction means comprises:
    a boundary trace-starting point detection means for segmenting the provided image into a plurality of small regions which partly overlap each other to obtain a boundary trace-starting point within a region where the variance of gray-level and the separation degree of the gray-level histogram in each region are maximum, and
    a boundary tracing direction calculation means connected to said boundary trace-starting point detection means for receiving the information on the trace-starting point fed from said boundary trace-starting point detection means and for obtaining the maximum gradation of gray-level on the basis of the information on the trace-starting point thereby to trace the boundary in a direction perpendicularly intersecting said maximum gradation and obtain the boundary information on the measured part.

4. An image processor according to claim 3, wherein said output circuit further comprises:
    a character memory for storing characters and symbols separately received; and
    said display means comprising means for displaying said characters and symbols stored in said character memory.

5. An image processor according to claim 3, wherein said boundary extraction means comprises:
    an aortic valve extraction means for finding constriction points on the left ventricular boundary obtained by said boundary trace-starting point detection means and said boundary tracing direction calculation means, where a left ventricle is observed as a part to be measured, and for calculating a straight line connecting both the constriction points as an aortic valve.

6. An image processor according to claim 5, wherein said output circuit further comprises:
- a character memory for storing characters and symbols separately received; and
- said display means comprising means for displaying said characters and symbols stored in said character memory.

7. An image processor according to claim 5, wherein said image processing circuit comprises:
- a centroid point calculation means, connected to said aortic valve extraction means so as to receive the information on the left ventricular boundary through said aortic valve extraction means and the information on the constriction points as an aortic valve obtained by said aortic valve extraction means and adapted to find a centroid point in the left ventricle, which varies over time, on the basis of the information on the left ventricle boundary and the constriction points so as to obtain a centroid movement view.

8. An image processor according to claim 7, wherein said output circuit further comprises:
- a character memory for storing characters and symbols separately received; and
- said display means comprising means for displaying said characters and symbols stored in said character memory.

9. An image processor according to claim 1, wherein said boundary extraction means comprises:
- an aortic valve extraction means for finding constriction points on the left ventricular boundary extracted in said boundary extraction means, where a left ventricle is observed as a part to be measured, and for calculating a straight line connecting both the constriction points as an aortic valve.

10. An image processor according to claim 9, wherein said image processing circuit comprises:
- a centroid point calculation means, connected to said aortic valve extraction means so as to receive the information on the left ventricular boundary through said aortic valve extraction means and the information on the constriction points as an aortic valve obtained by said aortic valve extraction means and adapted to find a centroid point in the left ventricle, which vary over time, on the basis of the information on the left ventricular boundary and the constriction points so as to obtain a centroid movement view.

11. An image processor according to claim 10, wherein said output circuit further comprises:
- a character memory for storing characters and symbols separately received; and
- said display means comprising means for displaying said characters and symbols stored in said character memory.

12. An image processor according to claims 1, 2, or 9, wherein said output circuit further comprises:
- a character memory for storing characters and symbols separately received; and
- said display means for displaying said characters and symbols stored in said character memory.

* * * * *